United States Patent
Allen et al.

(10) Patent No.: US 9,785,684 B2
(45) Date of Patent: Oct. 10, 2017

(54) DETERMINING TEMPORAL CATEGORIES FOR A DOMAIN OF CONTENT FOR NATURAL LANGUAGE PROCESSING

(71) Applicant: International Business Machines Corporation, Armonk, NY (US)

(72) Inventors: Corville O. Allen, Morrisville, NC (US); Albert A. Chung, Cary, NC (US); Andrew R. Freed, Cary, NC (US); Dorian B. Miller, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 454 days.

(21) Appl. No.: 14/297,335

(22) Filed: Jun. 5, 2014

(65) Prior Publication Data
US 2015/0356203 A1 Dec. 10, 2015

(51) Int. Cl.
*G06F 17/30* (2006.01)
*G06F 17/28* (2006.01)
*G06F 17/27* (2006.01)

(52) U.S. Cl.
CPC .... *G06F 17/30551* (2013.01); *G06F 17/2765* (2013.01); *G06F 17/30684* (2013.01)

(58) Field of Classification Search
CPC ......... G06F 17/30864; G06F 17/30867; G06F 17/30017
USPC ........................................................ 707/725
See application file for complete search history.

(56) References Cited

U.S. PATENT DOCUMENTS

| | | | |
|---|---|---|---|
| 7,917,354 B2 | 3/2011 | Ceusters et al. | |
| 8,156,111 B2 | 4/2012 | Jones et al. | |
| 8,275,306 B2 | 9/2012 | Attali | |
| 8,285,619 B2 | 10/2012 | Herz et al. | |
| 8,495,001 B2 | 7/2013 | Sweeney et al. | |
| 2009/0043749 A1 | 2/2009 | Garg et al. | |

(Continued)

FOREIGN PATENT DOCUMENTS

WO   WO 2013142493 A1 * 9/2013 ............. G06F 17/27

OTHER PUBLICATIONS

Ali Khodaei, Cyrus Shahabi, Amir Khodaei, "Temporal-Textual Retrieval: Time and Keyword Search in Web Documents", International Journal of Next-Generation Computing, vol. 3, No. 3, Nov. 2012.*

(Continued)

*Primary Examiner* — Hosain Alam
*Assistant Examiner* — Robert F May
(74) *Attorney, Agent, or Firm* — Stephen J. Walder, Jr.; William J. Stock

(57) ABSTRACT

Mechanisms are provided for processing sources of content in a corpus of information associated with a domain. The mechanisms ingest a plurality of sources of content in the corpus of information associated with the domain and determine at least one temporal category for the domain based on identification of frequently occurring references to at least one of temporal terms or time spans specified in the plurality of sources of content in the corpus of information associated with the domain. The mechanisms store the at least one temporal category for the domain in association with the domain and process queries applied to the plurality of sources of content in the corpus of information associated with the domain based on the stored at least one temporal category for the domain.

18 Claims, 7 Drawing Sheets

(56) References Cited

U.S. PATENT DOCUMENTS

| | | | |
|---|---|---|---|
| 2009/0070311 A1* | 3/2009 | Feng | G06F 17/30654 |
| 2009/0287678 A1* | 11/2009 | Brown | G06F 17/30654 |
| 2010/0299288 A1 | 11/2010 | Gruber | |
| 2011/0066587 A1 | 3/2011 | Ferrucci et al. | |
| 2011/0125734 A1* | 5/2011 | Duboue | G09B 7/00 707/723 |
| 2011/0153312 A1* | 6/2011 | Roberts | G06F 17/30654 704/9 |
| 2011/0320187 A1* | 12/2011 | Motik | G06F 17/278 704/9 |
| 2012/0324023 A1 | 12/2012 | Di Sciullo et al. | |
| 2013/0007055 A1 | 1/2013 | Brown et al. | |
| 2013/0018652 A1 | 1/2013 | Ferrucci et al. | |
| 2013/0066886 A1 | 3/2013 | Bagchi et al. | |
| 2013/0173608 A1* | 7/2013 | Sidhu | G06F 17/30398 707/725 |
| 2013/0262501 A1* | 10/2013 | Kuchmann-Beauger | G06F 17/30958 707/769 |

OTHER PUBLICATIONS

Allen, Corville et. al., "Cognitive Reminder Notification Based on Personal User Profile and Activity Information", filed May 22, 2015, U.S. Appl. No. 14/719,531.

Allen, Corville et. al., "Cognitive Reminder Notification Mechanisms for Answers to Questions", filed May 22, 2015, U.S. Appl. No. 14/719,473.

Allen, Corville et. al., "Cognitive Reminder Notification Mechanisms for Answers to Questions", filed Aug. 11, 2015, U.S. Appl. No. 14/822,997.

List of IBM Patents or Patent Applications Treated as Related, 1 page.

Dakka, Wisam et al., "Answering General Time-Sensitive Queries", IEEE Transactions on Knowledge and Data Engineering, vol. 24, Issue: 2, ISSN: 1041-437, Feb. 2012, pp. 222-235.

Gardon, Andrej, "Czech knowledge-based system with temporal reasoning", In Aleš Horák, Pavel Rychlý. RASLAN 2012: Recent Advances in Slavonic Natural Language Processing. Brno: Tribun EU, 2012. s. 35-42, 8 s. ISBN 978-80-263-0313-8, 7 pages.

High, Rob, "The Era of Cognitive Systems: An Inside Look at IBM Watson and How it Works", IBM Corporation, Redbooks, Dec. 12, 2012, 16 pages.

Kalyanpur, A et al., "Structured data and inference in DeepQA", IBM Journal of Research and Development, vol. 56, No. 3/4, May/Jul. 2012, 14 pages.

Khodaei, Ali et al., "Temporal-Textual Retrieval: Time and Keyword Search in Web Documents", International Journal of Next-Generation Computing, vol. 3, No. 3, Nov. 2012, 25 pages.

Yuan, Michael J., "Watson and healthcare, How natural language processing and semantic search could revolutionize clinical decision support", IBM developerWorks, IBM Corporation, Apr. 12, 2011, 14 pages.

"Correlation Coefficient", Stockcharts.com, http://stockcharts.com/help/doku.php?id=chart_school:technical_indicators:correlation_coeffici, accessed on Jun. 4, 2014, 10 pages.

Rummel, R.J., "Understanding Correlation", Honolulu: Department of Political Science, University of Hawaii, 1976, See Section 10.2 (Pattern-Magnitude Coefficients), http://www.hawaii.edu/powerkills/UC.HTM#S10.2, 46 pages.

* cited by examiner

DETERMINING TEMPORAL CATEGORIES FOR A DOMAIN OF CONTENT FOR NATURAL LANGUAGE PROCESSING

BACKGROUND

The present application relates generally to an improved data processing apparatus and method and more specifically to mechanisms for determining temporal categories for a domain of content for use with natural language processing mechanisms.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating Question and Answer (QA) systems which may take an input question, analyze it, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

One such QA system is the IBM Watson™ system available from International Business Machines (IBM) Corporation of Armonk, N.Y. The IBM Watson™ system is an application of advanced natural language processing, information retrieval, knowledge representation and reasoning, and machine learning technologies to the field of open domain question answering. The IBM Watson™ system is built on IBM's DeepQA™ technology used for hypothesis generation, massive evidence gathering, analysis, and scoring. DeepQA™ takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

Various United States Patent Application Publications describe various types of question and answer systems. U.S. Patent Application Publication No. 2011/0125734 discloses a mechanism for generating question and answer pairs based on a corpus of data. The system starts with a set of questions and then analyzes the set of content to extract answer to those questions. U.S. Patent Application Publication No. 2011/0066587 discloses a mechanism for converting a report of analyzed information into a collection of questions and determining whether answers for the collection of questions are answered or refuted from the information set. The results data are incorporated into an updated information model.

SUMMARY

In one illustrative embodiment, a method, in a data processing system comprising a processor and a memory, for processing sources of content in a corpus of information associated with a domain is provided. The method comprises ingesting, by the data processing system, a plurality of sources of content in the corpus of information associated with the domain. The method further comprises determining, by the data processing system, at least one temporal category for the domain based on identification of frequently occurring references to at least one of temporal terms or time spans specified in the plurality of sources of content in the corpus of information associated with the domain. Moreover, the method comprises storing, by the data processing system, the at least one temporal category for the domain in association with the domain. In addition, the method comprises processing, by the data processing system, queries applied to the plurality of sources of content in the corpus of information associated with the domain based on the stored at least one temporal category for the domain.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
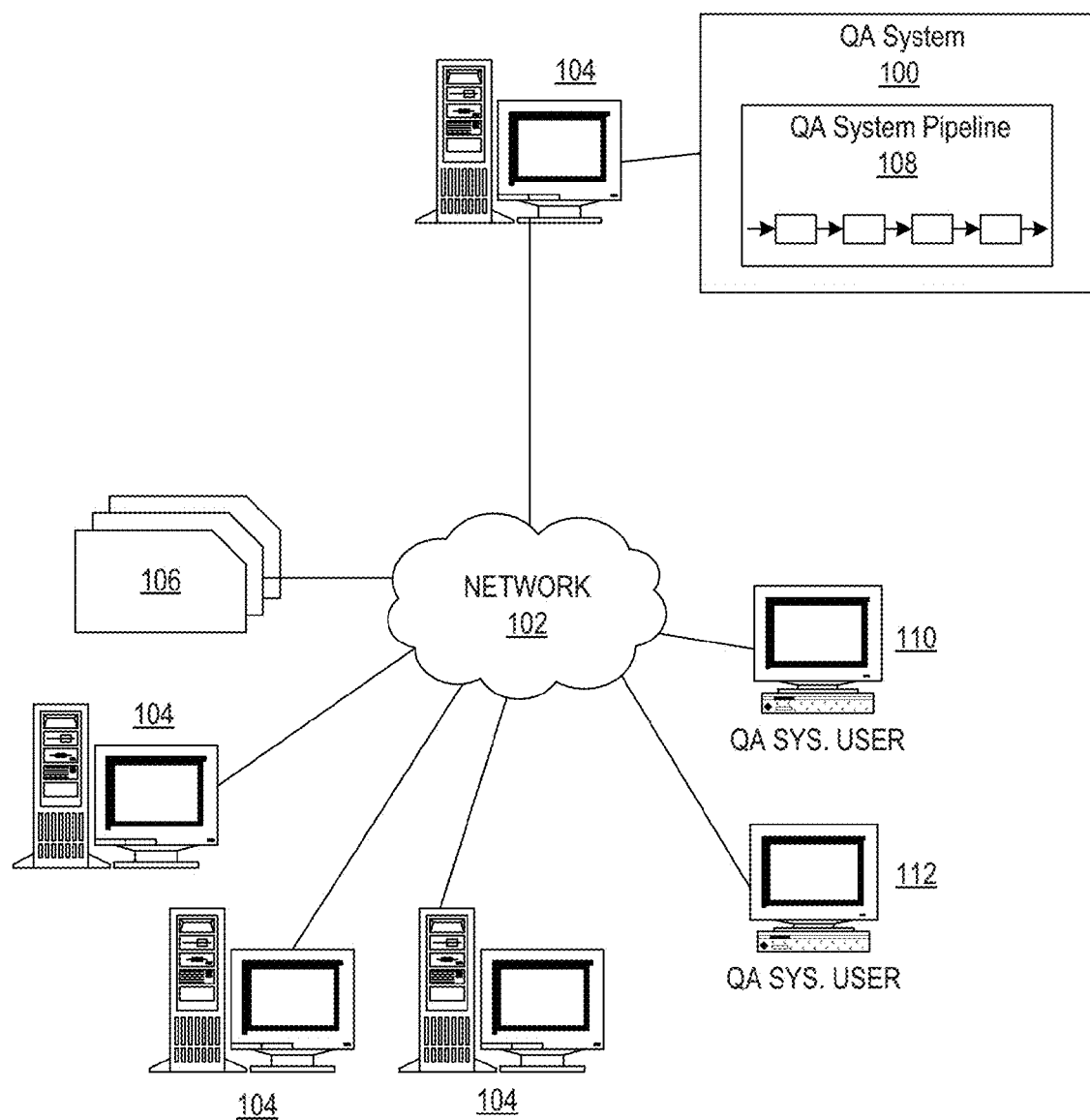
FIG. 1 depicts a schematic diagram of one illustrative embodiment of a question/answer creation (QA) system in a computer network.

A question and answer system (QA system) is an artificial intelligence application executing on data processing hardware that answers questions pertaining to a given subject-matter domain or domains presented in natural language. The QA system may receive inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the QA system. The document may include any file, text, article, or source of data for use in the QA system. For example, a QA system accesses a body of knowledge about the domain, where the body of knowledge (knowledgebase) can be organized in a variety of configurations, e.g., a structured repository of domain-specific information, such as ontologies, or unstructured data related to the domain, or a collection of natural language documents about the domain.

Content users input questions to the QA system which then answers the input questions using the content in the corpus of data by evaluating documents, sections of documents, portions of data in the corpus, or the like. When a process evaluates a given section of a document for semantic content, the process can use a variety of conventions to query such document from the QA system, e.g., sending the query to the QA system as a well-formed question which are then interpreted by the QA system and a response is provided containing one or more answers to the question. Semantic content is content based on the relation between signifiers, such as words, phrases, signs, and symbols, and what they stand for, their denotation, or connotation. In other words, semantic content is content that interprets an expression, such as by using Natural Language Processing.

As will be described in greater detail hereafter, the QA system receives an input question, parses the question to extract the major features of the question, uses the extracted features to formulate queries, and then applies those queries to the corpus of data. Based on the application of the queries to the corpus of data, the QA system generates a set of hypotheses or candidate answers to the input question, by looking across the corpus of data for portions of the corpus of data that have some potential for containing a valuable response to the input question. The QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, natural language analysis, lexical analysis, or the like, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the QA system. The statistical model may then be used to summarize a level of confidence that the QA system has regarding the evidence that the potential response, i.e. candidate answer, is inferred by the question. This process may be repeated for each of the candidate answers until the QA system identifies candidate answers that surface as being significantly stronger than others and thus, generates a final answer, or ranked set of answers, for the input question.

Often times when submitting a question to a QA system the time span context of the question is not clear from the question itself and yet may have a significant impact on whether the correct answer for the question is returned by the QA system. Consider, for example, the question "What is the best NFL defense?" This particular question could be answered based on the current NFL football season, the past twelve months of games played in the NFL, or the entire history of the NFL. It is not clear from the question the basis from which the user is requesting the answer to be generated. Similarly, for the question "How do I reset my Apple iPod?" the answer may be different depending upon whether the basis for generating the answer is a historical time span, e.g., Apple iPod versions 1 through 3, or a current time span, i.e. version 4.

Without asking the user for more information from which to discern the time span of interest for generating the answer to the input question, the QA system may not have a clear time span context from which to generate the answer to the question and the QA system will not know which time span context is most likely to be correct. As a result, the user may be presented with answers that do not match the intended temporal context of the original input question, e.g., the user may receive an answer of Pittsburgh Steelers (for the 1970s) when instead the user was wanting to know the best defense in the NFL for the last NFL season, e.g., in the year 2013. Moreover, each domain operated on by the QA system may have a different time span that is of most importance to that particular domain, e.g., "years" for one domain, "seasons" for another domain, "release cycles" for a third domain, etc.

The illustrative embodiments provide mechanisms for discerning the time span context of an input question that is most likely to generate a correct answer to the input question when the time span context is not readily apparent from the content of the input question itself, e.g., when a time span is not explicitly stated in the input question. The mechanisms of the illustrative embodiments categorize the primary temporal characteristics for terms, the focus, the lexical answer type (LAT), or other input question components, or extracted "features," into one or more temporal categories which may then be used to categorize the input question as a whole as to a particular time span context that may be used to focus the operation of the QA system to identify sources of answers pertaining to the identified time span context. As described hereafter, in one illustrative embodiment, the temporal category for the question is generated by taking the focus, LAT, and terms as n-grams and matching them against a set of corpora analyzed and annotated with time-spans for n-grams and terms or lexical answer type with the most prevalent or frequently found being a temporal category (e.g., historical, normal, or current) based on the initial set of n-grams.

The categorization of the terms, focus, LAT, and other input question components may be performed using a temporal context corpus or sub-corpus of content which may be analyzed to identify the most likely time span (temporal) context for an input question or concept. For example, a corpus or sub-corpus of sports articles and publications may be analyzed to identify portions of the corpus or sub-corpus that reference defenses in the NFL and determine for these references, the most often mentioned time span or temporal characteristic in association with the concept of NFL defenses, e.g., the terms "NFL defense," "defenses in the NFL" or any other permutation of these terms. Comparing the time span or temporal characteristics to a current time characteristic, the time span or temporal characteristic (hereafter referred to only as the temporal characteristics) may be categorized into one of a plurality of pre-defined temporal characteristic classifications, e.g., historical, normal, current, etc. A data structure may be generated that maps the terms, the focus, the LAT, the input question and/or concepts in the input question to a particular temporal characteristic category. This temporal category mapping data structure may store such mappings for a plurality of terms, focus, LAT, input questions and/or concepts for a particular domain. This mapping may be periodically updated through repeated analysis to refine the mapping based on the most recent modifications to the corpus or sub-corpus of content, e.g., as more content is added to the corpus or sub-corpus, or removed from the corpus and sub-corpus, the temporal characteristics associated with an input question or concept may change and the mapping may be periodically updated to reflect these changes.

This temporal category is then used by the QA system pipeline when evaluating sources of content in the corpus during candidate answer generation. In order to evaluate the corpus, the sources of content in the corpus are ingested by the QA system and evaluated with regard to pre-defined temporal categories for the particular domain of that corpus. That is, there may be various domains and various corpora defined upon which the QA system operates, and there may be different pre-defined temporal categories for the various domains. During ingestion, various criteria for determining a temporal category for a particular source within the corpus may be utilized.

For example, a last modified date, creation date, posting date, etc. of the particular source (e.g., document, article, passage, posting, etc.) may be used as a basis for categorizing the source into one of the pre-defined temporal categories based on whether the date falls within a range of dates corresponding to the temporal category, e.g., normal=a season, current=current season, historical=all seasons before 1990. In another example, dates mentioned within the article itself may be identified and sorted to identify the temporal category of individual portions of the source or used to generate a temporal category for the source as a whole, e.g., majority categorization, average categorization, weighted categorization favoring a particular categorization, or any other categorization scheme suitable to the particular implementation. In still a further example, text markers within the text of the source may be used to determine a temporal category for the source, e.g., text markers such as "last season," "version 3," "Mac OS Lion" (where "Lion" represents a version of the Mac OS). Through the ingestion of the sources of content in the corpus, an annotated corpus is generated that comprises annotations as to the temporal categorizations for the various sources which may then be used along with the analysis of the input question with regard to temporal categorizations to determine which sources in the corpus are relevant to the particular input question.

Through matching of the determined temporal categorization of the input question, such as via a lookup operation in the temporal mapping data structure, and the identification of matching/not matching temporal categorizations of the sources within the corpus, such as identified by way of analysis of content of the sources and/or metadata associated with these sources to identify the most often found or highest frequency temporal categorizations, time spans, or the like, weightings are applied to evidence passages from sources of content in the corpus based on whether the temporal categorizations of the evidence passages match or do not match the temporal category identified by the lookup operation. Thus, evidence passages or metadata that are determined to have a temporal categorization of "historical" will not match the temporal category of "current" and thus, will have a lower weighting when being evaluated for an input question whose temporal category is determined to be "current". If the input question is determined to have a temporal category of "historical", then the evidence passage will be provided with a relatively higher weighting due to the match of the temporal categories. Of course, these weighting values may take any value depending upon the particular implementation, even zero, such that the evidence passage may be disregarded entirely if it does not have a temporal categorization matching the input question.

In some illustrative embodiments, the temporal categorization may be used as a basis for selecting multiple answers to the input question to present to a user for each of the temporal categorizations. Thus, for example, if there are three temporal categorizations, a separate answer may be generated for each temporal categorization and presented to the user as alternative answers for the same input question depending on the desired time frame the user wanted for the input question. Using the above example question again, i.e. "What is the best NFL defense?", a historical answer of "Pittsburgh Steelers" may be output, a normal answer of "New England Patriots" may be output, and a current answer of "Dallas Cowboys" may be output with indicates as to which temporal categories these answers correspond. In such a case, weightings may not necessarily be applied based on the temporal categorization matching, but instead the answers may be maintained separate for each temporal categorization.

In some illustrative embodiments, the corpus, sub-corpus, or the like, that is used as a source for performing temporal characteristic categorization comprises one or more crowdsourcing sources, e.g., websites, electronic mail groups, domain expert communities, tweets, news feeds, blogs, or the like. Crowdsourcing sources may also comprise actions performed by a collection of individuals which may influence results generated by a QA system that utilizes the crowdsourcing information, such as likes/dislikes specified by users, "thumbs up" inputs associated with terms/concepts and time spans, or the like. Crowdsourcing, or "crowd" "outsourcing", is the practice of obtaining needed services, ideas, or content by soliciting contributions from a large group of people, and especially from an online community, rather than from traditional employees or suppliers. Crowdsourcing combines the efforts of numerous self-identified volunteers or workers, where each contributor of their own initiative adds a small portion to the greater result. In the context of the present description, crowdsourcing comprises a large number of individuals providing electronic input to an online community, e.g., website, by way of submitting textual content, e.g., statements, posts, documents, articles, or the like, that are directed to a particular domain, subject matter, concept, or the other defined area of interest.

The crowdsourcing sources are ingested and the sources that match a given domain are identified through the ingestion process. The crowdsourcing sources that match the given domain are further analyzed by the mechanisms of the illustrative embodiments by identifying the key terms and concepts within the sources using one or more techniques and then determining the dates/time keywords and spans associated with each of these concepts in the source (e.g., document). The identification of the key terms and concepts may be determined using any of a number of techniques including generating inverse document frequency (IDF) metrics, n-gram counts, or the like, for documents in the domain where words/phrases that appear much more often in the domain represent the key terms and concepts. Moreover, semantic analysis technologies may be used, such as a slot grammar parser, predicate-argument structure builder, named entity recognizer, co-reference resolution component, relation extraction component, or the like. Any combination of these techniques may also be used to identify the key terms and concepts within the crowdsourcing sources.

Once the key terms and concepts within the crowdsourcing sources are identified, date and time keywords and spans associated with each key term/concept in the document are identified. For example, terms such as "season", "year", "version", and the like may be identified in sentences or other close proximity to the key terms and concepts in the sources. The frequency of the occurrence of such date/time keywords and spans is maintained, such as by using counters or the like, so that a relative frequency of date/time keywords and spans may be identified. For example, in sources directed to the NFL sports domain, sentences of the type "The game this week between the Eagles and the Cowboys" and "The 2012-2013 season has had plenty of ups and downs" are most likely to occur and from these, one can determine that the key terms or concepts of "game" and "season" apply to the NFL domain with related date/time keywords or spans being "week" and "year" (from season). Once identifying the keywords and concepts and their relationships with date/time keywords or spans, the frequency of the occurrence of these relationships is determined and the most frequent of these are identified, e.g., in sources about the NFL, "game" most often maps to "week", "season" most often maps to "year", and "Super Bowl" maps to both "year" and "week". In addition, the crowdsourced indicators that include, but are not limited to likes, thumbs up, and the plurality of replies or gamification data (data representing game thinking or game mechanics in non-game contexts for engaging users in solving problems) are associated with the key concepts, temporal terms and time spans where a plurality or major occurrences of these items are treated as key indicators of domain temporal categories.

For each key term or concept, a plot of the concept occurrence frequency against time is generated using the temporal relationship between the key term/concept and the date/time keywords or spans and/or crowdsourced indicators. As a result, a plot of the most frequent time span for each key term or concept is generated. This plot may then be programmatically analyzed to locate patterns that would indicate a time span for a certain concept in a domain. A typical pattern would be when a curve of the graph rises steeply, plateaus, and then declines steeply. In other words, if the extrapolated graph points form a shape that rises in one discrete step, then levels, and then falls in one discrete step, the mechanisms of the illustrative embodiments reason that the boundaries of this shape on the time span axis are the time span for the concept. Other shapes and formations within the graph may also be identified as representative of date/time keywords or spans depending on the particular desired implementation. Essentially, with crowdsource sources, the crowdsourced information will show an association to concepts/time spans and the collective crowd of individuals will give an indication by their participation to trend towards a particular time span which can be used to identify a temporal category.

Thus, through the above analysis of crowdsourcing sources, the mechanisms of the illustrative embodiments may determine the most frequently occurring date/time keywords or time spans associated with a given domain. This operation can be performed to identify different temporal categories for the domain, such as normal temporal categories, historical temporal categories, and/or current temporal categories based on the relative frequency of the occurrence of the date/time keywords or spans and further statistical analysis to identify repeating patterns. In one illustrative embodiment, a normal temporal category is determined based on the most frequently occurring pattern or cycle identified in the plot of the date/time versus activity (e.g., frequency of occurrence of references to the key term/concept). A current temporal category may be determined to be the last or most current time span corresponding to the identified normal pattern, e.g., a normal pattern may be determined to be a "season" and the current temporal category would be the most recent or current "season" relative to the present date/time. Alternatively, the current temporal category may be determined based on the most current time span plus a term indicator, e.g., the current version or release plus a predetermined time indicator (for example, last release of the product+6 months up to the current date/time).

The historical temporal category may be determined in multiple ways. In one illustrative embodiment, a subject matter expert may define the historical temporal category based on the plot of activity versus time and/or based on the subject matter experts analysis of portions of the corpus for the given domain. In another illustrative embodiment, the series of normal time span patterns identified in the plot may be analyzed to determine a first portion of the time span patterns that are to be considered the historical time spans while the remaining will fall into either normal or current time span categorizations, e.g., the first X % of time span patterns are considered the historical temporal category, the most recent time span pattern is considered the current temporal category, and all other time spans fall within the normal temporal category. It should be appreciated that any point in the plot may fall into two or more categories depending upon the implementation, e.g., a point in the plot may be both historical and normal or both normal and current.

For example, in the NFL domain, it may be determined that normally, individuals make statements regarding NFL domain concepts with regard to seasons but when referencing historical concepts, they refer to seasons prior to 1990, and the most current sources reference the current season. As a result, three temporal categories are generated: normal=season, current=current season, and historical=seasons prior to 1990. As noted above, this process may be performed during an ingestion operation for ingesting sources of content of a particular domain in order to identify the temporal categories associated with the particular domain. Thus, there may be different sets of temporal categories for different domains.

Similar analysis may be performed with regard to the input questions that are received as well, in order to identify the most frequently occurring date/time context for the input question. For example, taking the input question characteristics, e.g., focus, LAT, identified key terms or concepts, and the like, searches of the crowdsourcing sources are performed to identify temporal indicators for the information being exchanged amongst the participants in the crowdsourcing communities with regard to the focus, LAT, identified key terms, or the like. Thus, for example, for the question "What is the best NFL defense?", a crowdsourcing community directed to discussion of the NFL teams may be analyzed to identify content submitted by participants directed to discussions of NFL team defenses. Among these, discussions of the "best" NFL defense may be identified and corresponding temporal characteristics of the discussions may be extracted, e.g., "this season", "of all time", "in 2013", or the like, may be identified. Statistics regarding the temporal categorization of these temporal characteristics may be generated to determine the temporal categorization that is most often discussed or referenced and this temporal categorization may be used to categorize the question, the LAT, the focus, extracted key terms, or the like, into a temporal category, e.g., normal, historical, current, etc., for use by the QA system pipeline when answering questions of this nature. The mapping of temporal categorization with the extracted features of the input question may be maintained in the temporal categorization mapping data structure previously mentioned above. Thus, crowdsourcing may be leveraged to provide indications of temporal categorizations for input questions which may then be used to optimize answer generation by the QA system.

Figure 2:
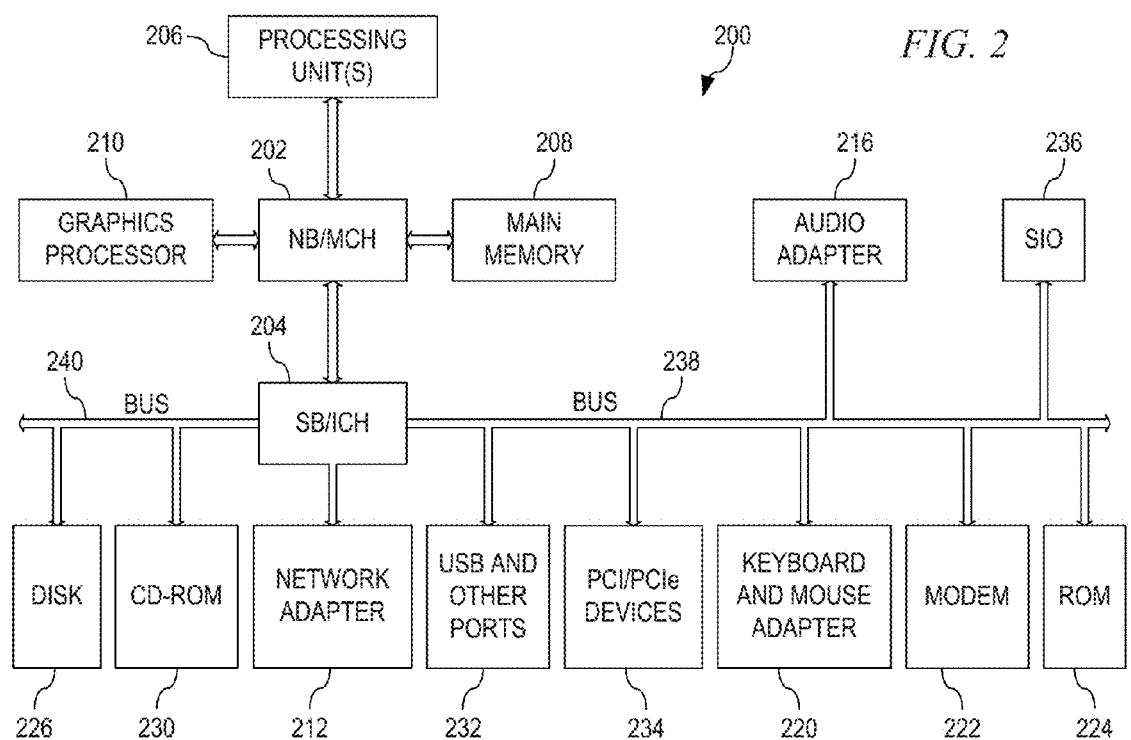
FIG. 2 is a block diagram of an example data processing system in which aspects of the illustrative embodiments may be implemented.
Figure 3:
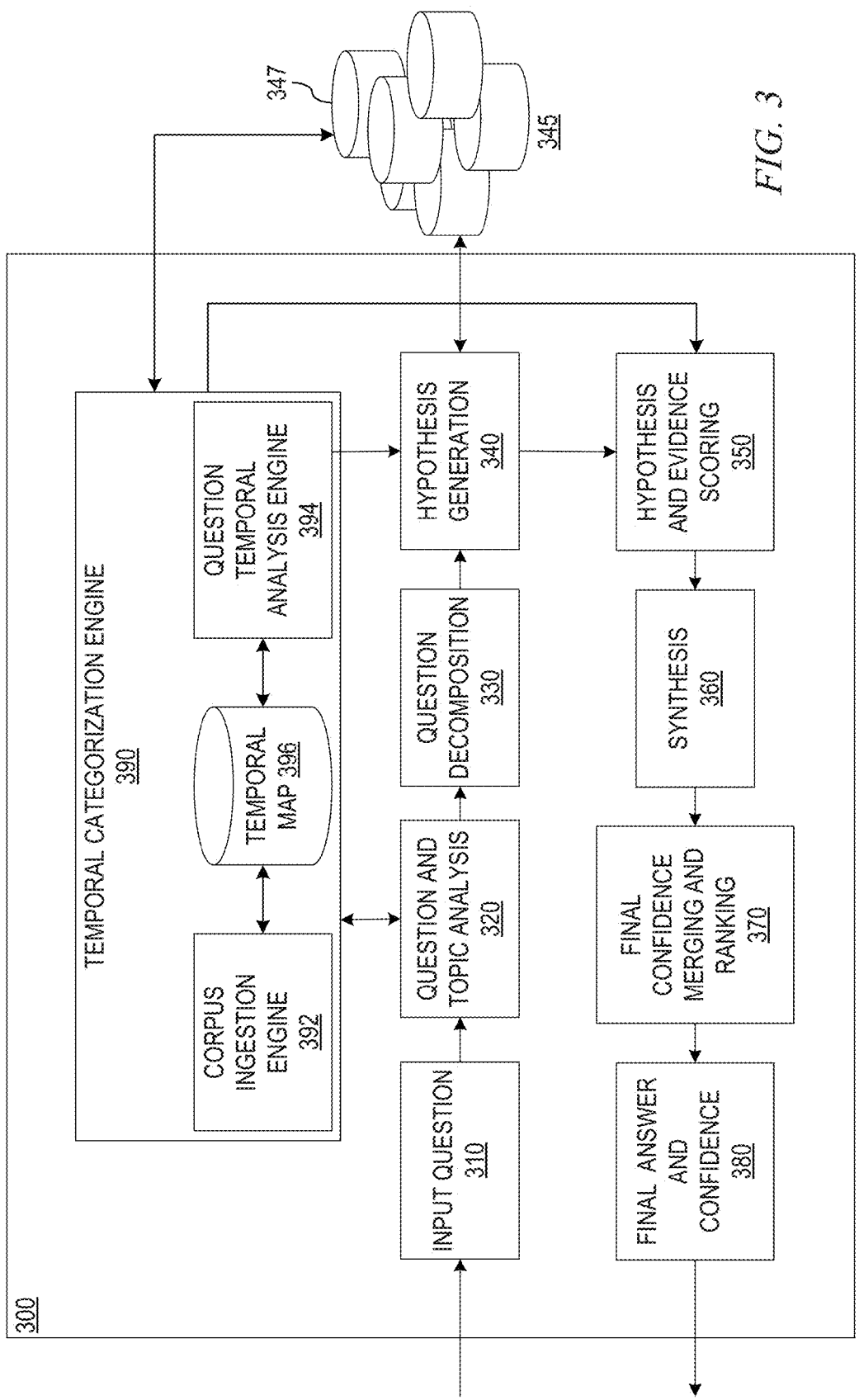
FIG. 3 illustrates a QA system pipeline for processing an input question in accordance with one illustrative embodiment.

FIGS. 1-3 are directed to describing an example Question/Answer, Question and Answer, or Question Answering (QA) system, methodology, and computer program product with which the mechanisms of the illustrative embodiments may be implemented. As will be discussed in greater detail hereafter, the illustrative embodiments may be integrated in, and may augment and extend the functionality of, these QA system mechanisms with regard to ingestion of a corpus in accordance with pre-defined temporal categorizations, categorizing input questions into a temporal categorization, and generating answers to input questions based on temporal categorizations of input questions and the temporal categorization of evidence passages within the corpus.

Thus, it is important to first have an understanding of how question and answer creation in a QA system may be implemented before describing how the mechanisms of the illustrative embodiments are integrated in and augment such QA systems. It should be appreciated that the QA mechanisms described in FIGS. 1-3 are only examples and are not intended to state or imply any limitation with regard to the type of QA mechanisms with which the illustrative embodiments may be implemented. Many modifications to the example QA system shown in FIGS. 1-3 may be implemented in various embodiments of the present invention without departing from the spirit and scope of the present invention.

QA mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e. candidate answers.

Content creators, such as article authors, electronic document creators, web page authors, document database creators, and the like, may determine use cases for products, solutions, and services described in such content before writing their content. Consequently, the content creators may know what questions the content is intended to answer in a particular topic addressed by the content. Categorizing the questions, such as in terms of roles, type of information, tasks, or the like, associated with the question, in each document of a corpus of data may allow the QA system to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA system. Content creators, automated tools, or the like, may annotate or otherwise generate metadata for providing information useable by the QA system to identify these question and answer attributes of the content.

Operating on such content, the QA system generates answers for input questions using a plurality of intensive analysis mechanisms which evaluate the content to identify the most probable answers, i.e. candidate answers, for the input question. The illustrative embodiments leverage the work already done by the QA system to reduce the computation time and resource cost for subsequent processing of questions that are similar to questions already processed by the QA system.

FIG. 1 depicts a schematic diagram of one illustrative embodiment of a question/answer creation (QA) system 100 in a computer network 102. One example of a question/answer generation which may be used in conjunction with the principles described herein is described in U.S. Patent Application Publication No. 2011/0125734, which is herein incorporated by reference in its entirety. The QA system 100 may be implemented on one or more computing devices 104 (comprising one or more processors and one or more memories, and potentially any other computing device elements generally known in the art including buses, storage devices, communication interfaces, and the like) connected to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. The QA system 100 and network 102 may enable question/answer (QA) generation functionality for one or more QA system users via their respective computing devices 110-112. Other embodiments of the QA system 100 may be used with components, systems, sub-systems, and/or devices other than those that are depicted herein.

The QA system 100 may be configured to implement a QA system pipeline 108 that receive inputs from various sources. For example, the QA system 100 may receive input from the network 102, a corpus of electronic documents 106, QA system users, or other data and other possible sources of input. In one embodiment, some or all of the inputs to the QA system 100 may be routed through the network 102. The various computing devices 104 on the network 102 may include access points for content creators and QA system users. Some of the computing devices 104 may include devices for a database storing the corpus of data 106 (which is shown as a separate entity in FIG. 1 for illustrative purposes only). Portions of the corpus of data 106 may also be provided on one or more other network attached storage devices, in one or more databases, or other computing devices not explicitly shown in FIG. 1. The network 102 may include local network connections and remote connections in various embodiments, such that the QA system 100 may operate in environments of any size, including local and global, e.g., the Internet.

In one embodiment, the content creator creates content in a document of the corpus of data 106 for use as part of a corpus of data with the QA system 100. The document may include any file, text, article, or source of data for use in the QA system 100. QA system users may access the QA system 100 via a network connection or an Internet connection to the network 102, and may input questions to the QA system 100 that may be answered by the content in the corpus of data 106. In one embodiment, the questions may be formed using natural language. The QA system 100 may interpret the question and provide a response to the QA system user, e.g., QA system user 110, containing one or more answers to the question. In some embodiments, the QA system 100 may provide a response to users in a ranked list of candidate answers.

The QA system 100 implements a QA system pipeline 108 which comprises a plurality of stages for processing an input question, the corpus of data 106, and generating answers for the input question based on the processing of the corpus of data 106. The QA system pipeline 108 will be described in greater detail hereafter with regard to FIG. 3.

In some illustrative embodiments, the QA system 100 may be the IBM Watson™ QA system available from International Business Machines Corporation of Armonk, N.Y., which is augmented with the mechanisms of the illustrative embodiments described hereafter. The IBM Watson™ QA system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

FIG. 2 is a block diagram of an example data processing system in which aspects of the illustrative embodiments may be implemented. Data processing system 200 is an example of a computer, such as server 104 or client 110 in FIG. 1, in which computer usable code or instructions implementing the processes for illustrative embodiments of the present invention may be located. In one illustrative embodiment, FIG. 2 represents a server computing device, such as a server 104, which, which implements a QA system 100 and QA system pipeline 108 augmented to include the additional mechanisms of the illustrative embodiments described hereafter.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 illustrates a QA system pipeline for processing an input question in accordance with one illustrative embodiment. The QA system pipeline of FIG. 3 may be implemented, for example, as QA system pipeline 108 of QA system 100 in FIG. 1. It should be appreciated that the stages of the QA system pipeline shown in FIG. 3 may be implemented as one or more software engines, components, or the like, which are configured with logic for implementing the functionality attributed to the particular stage. Each stage may be implemented using one or more of such software engines, components or the like. The software engines, components, etc. may be executed on one or more processors of one or more data processing systems or devices and may utilize or operate on data stored in one or more data storage devices, memories, or the like, on one or more of the data processing systems. The QA system pipeline of FIG. 3 may be augmented, for example, in one or more of the stages to implement the improved mechanism of the illustrative embodiments described hereafter, additional stages may be provided to implement the improved mechanism, or separate logic from the pipeline 300 may be provided for interfacing with the pipeline 300 and implementing the improved functionality and operations of the illustrative embodiments.

As shown in FIG. 3, the QA system pipeline 300 comprises a plurality of stages 310-380 through which the QA system operates to analyze an input question and generate a final response. In an initial question input stage 310, the QA system receives an input question that is presented in a natural language format. That is, a user may input, via a user interface, an input question for which the user wishes to obtain an answer, e.g., "Who are Washington's closest advisors?" In response to receiving the input question, the next stage of the QA system pipeline 500, i.e. the question and topic analysis stage 320, parses the input question using natural language processing (NLP) techniques to extract major features from the input question, classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

The identified major features may then be used during the question decomposition stage 330 to decompose the question into one or more queries that may be applied to the corpora of data/information 345 in order to generate one or more hypotheses. The queries may be generated in any known or later developed query language, such as the Structure Query Language (SQL), or the like. The queries may be applied to one or more databases storing information about the electronic texts, documents, articles, websites, and the like, that make up the corpora of data/information 345. That is, these various sources themselves, different collections of sources, and the like, may represent a different corpus 347 within the corpora 345. There may be different corpora 347 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus 347 within the corpora 345.

The queries may be applied to one or more databases storing information about the electronic texts, documents, articles, websites, and the like, that make up the corpus of data/information, e.g., the corpus of data 106 in FIG. 1. The queries being applied to the corpus of data/information at the hypothesis generation stage 340 to generate results identifying potential hypotheses for answering the input question which can be evaluated. That is, the application of the queries results in the extraction of portions of the corpus of data/information matching the criteria of the particular query. These portions of the corpus may then be analyzed and used, during the hypothesis generation stage 340, to generate hypotheses for answering the input question. These hypotheses are also referred to herein as "candidate answers" for the input question. For any input question, at this stage 340, there may be hundreds of hypotheses or candidate answers generated that may need to be evaluated.

The QA system pipeline 300, in stage 350, then performs a deep analysis and comparison of the language of the input question and the language of each hypothesis or "candidate answer" as well as performs evidence scoring to evaluate the likelihood that the particular hypothesis is a correct answer for the input question. As mentioned above, this may involve using a plurality of reasoning algorithms, each performing a separate type of analysis of the language of the input question and/or content of the corpus that provides evidence in support of, or not, of the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis.

In the synthesis stage 360, the large number of relevance scores generated by the various reasoning algorithms may be synthesized into confidence scores for the various hypotheses. This process may involve applying weights to the various scores, where the weights have been determined through training of the statistical model employed by the QA system and/or dynamically updated, as described hereafter. The weighted scores may be processed in accordance with a statistical model generated through training of the QA system that identifies a manner by which these scores may be combined to generate a confidence score or measure for the individual hypotheses or candidate answers. This confidence score or measure summarizes the level of confidence that the QA system has about the evidence that the candidate answer is inferred by the input question, i.e. that the candidate answer is the correct answer for the input question.

The resulting confidence scores or measures are processed by a final confidence merging and ranking stage 370 which may compare the confidence scores and measures, compare them against predetermined thresholds, or perform any other analysis on the confidence scores to determine which hypotheses/candidate answers are the most likely to be the answer to the input question. The hypotheses/candidate answers may be ranked according to these comparisons to generate a ranked listing of hypotheses/candidate answers (hereafter simply referred to as "candidate answers"). From the ranked listing of candidate answers, at stage 380, a final answer and confidence score, or final set of candidate answers and confidence scores, may be generated and output to the submitter of the original input question.

As shown in FIG. 3, in accordance the illustrative embodiments, a temporal categorization engine 390 is provided that is configured with logic for ingesting sources of content, e.g., documents, crowdsourcing sources such as tweets, blog posts, news feeds, etc., crowdsource indicators such as thumbs-up, likes, retweets, etc., and the like in the corpus 347 and/or corpora 345, and categorizing the sources of content with regard to a plurality of pre-defined temporal categories for the domain of that particular corpus 347 and/or corpora 345. The pre-defined temporal categories may be determined by the temporal categorization engine 390 when ingesting the corpus 347 and/or corpora 345 by analyzing the key terms/concepts for a particular domain and their relationship to date/time keywords and spans, determining the frequency of occurrence of these relationships, and performing additional programmatic analysis of plots of these relationships to identify temporal categories to be used with a domain. This may be done for a plurality of domains such that different sets of temporal categories may be established for different domains. These operations for ingesting the corpus 347 and/or corpora 345 will be described in greater detail hereafter.

In addition, the temporal categorization engine 390 is further configured with logic for analyzing extracted features of an input question 310 and determine if the extracted features indicate that the answer to the input question 310 is affected by temporal characteristics, e.g., may be different depending upon the particular temporal characteristic selected for the candidate answer. The temporal categorization engine 390 further comprises logic that determines a temporal categorization of the input question 310 if the input question 310 calls for an answer that is affected by a temporal characteristic, and evaluates candidate answers in accordance with this temporal categorization of the input question and a degree of matching of the temporal categorization of the input question 310 to the temporal categorization of the evidence passage that is a source of the candidate answer.

The temporal categorization engine 390 may be configured, such as by a system administrator or other authorized person, with one or more sets of pre-defined temporal categorizations and/or associated time spans, for one or more domains. For example, if the QA system 300 operates on a plurality of domains, a different set of pre-defined temporal categorizations and/or time spans may be established for each domain. Alternatively, a same set of pre-defined temporal categorizations may be used for a plurality of domains. As noted above, rather than requiring a system administrator, subject matter expert, or other authorized person to manually input the pre-defined temporal categorizations for the domains, an analytical engine may be used during ingestion of a corpus 347 or corpora 345 to automatically determine the temporal categorizations for domains. This process will be described in greater detail hereafter. In either case, a mapping of domains to pre-defined temporal categorizations and the requirements for classification into the temporal categorization, e.g., associated time spans or the like, may be stored in the configuration data structure, such as in a temporal map 396, along with any other configuration parameters or settings needed to configure the temporal categorization engine 390 for use in accordance with the description herein.

As shown in FIG. 3, the temporal categorization engine 390 comprises a corpus ingestion engine 392 which operates to ingest the corpus 347 or corpora 345 with regard to temporal characteristics so as to identify the pre-determined temporal categorizations for a domain if none have already been defined, or if the pre-determined temporal categorizations need to be updated, and also to associate with each source, evidence passage, or portion of content in the corpus 347 or corporate 345 that is ingested, a corresponding one of the pre-determined temporal categorization. The corpus ingestion engine 392 of the temporal categorization engine 390 utilizes the pre-defined temporal categorizations of the particular domain of the corpus 347 being ingested to evaluate the sources within the corpus 347 with regard to their temporal categorizations. A default temporal categorization may be established that may be used in situations where another temporal categorization for a source cannot be identified, e.g., a "normal" temporal category having a default "normal" temporal category value, e.g., "season", "year", "version", or the like.

As noted above, the pre-determined temporal categorizations may be manually specified by a user, such as a subject matter expert, system administrator or otherwise authorized individual. Alternatively, the corpus ingestion engine 392 may apply logic to the sources of content that are part of the corpus 347 or corpora 345, or a sub-corpus or sub-portion of sources of content that are specifically selected for evaluation to identify pre-determined temporal categorizations for a domain. For example, the corpus 347 or corpora 345 may comprise crowdsourcing sources which may be used as a basis for analysis to identify the date/time keywords and spans that are most associated by individuals with different domain specific terms or concepts and then use the frequency of the occurrence of these temporal relationships between the date/time keywords or spans and key terms or concepts to determine the most relevant temporal categories for the domain.

In one illustrative embodiment, the crowdsourcing sources are ingested and the sources that match a given domain are identified through the ingestion process. The matching of crowdsourcing sources with a given domain may be performed, for example, by identifying metadata associated with the sources and the domain and identifying a correspondence between the metadata, e.g., descriptive terms specifying the subject matter of the source/domain. For example, metadata defining the publisher or poster of the source may be correlated with a subject matter domain, using a document repository that identifies the domains and sub-domains of documents (such as may be specified by a subject matter expert), or the like.

The crowdsourcing sources that match the given domain are further analyzed by the corpus ingestion engine 392 by identifying the key terms and concepts within the sources using one or more techniques and then determining the dates/time keywords and time spans associated with each of these concepts in the source (e.g., document). As mentioned above, the identification of the key terms and concepts may be determined using any of a number of techniques including generating inverse document frequency (IDF) metrics, n-gram counts, or the like, for documents in the domain where words/phrases that appear much less often in the domain represent the key terms and concepts. Moreover, semantic analysis technologies may be used, such as a slot grammar parser, predicate-argument structure builder, named entity recognizer, co-reference resolution component, relation extraction component, or the like. Any combination of these techniques may also be used to identify the key terms and concepts within the crowdsourcing sources.

Once the key terms and concepts within the crowdsourcing sources are identified, the corpus ingestion engine 392 identifies date and time keywords and time spans associated with each key term/concept in the document. For example, terms such as "season", "year", "version", and the like may be identified in sentences or other close proximity to the key terms and concepts in the sources, e.g., within a specified word, character, term, syntactical structure, or other distance of the key term/concept. The frequency of the occurrence of such date/time keywords and spans is maintained, such as by using counters or the like, so that a relative frequency of date/time keywords and spans may be identified. Once identifying the keywords and concepts and their relationships with date/time keywords or spans, the frequency of the occurrence of these relationships is determined and the most frequent of these are identified, e.g., in sources about the NFL, "game" most often maps to "week", "season" most often maps to "year", and "Super Bowl" maps to both "year" and "week".

For each key term or concept, a plot of the concept occurrence frequency against time is generated using the temporal relationship between the key term/concept and the date/time keywords or spans. Patterns in the plot are then identified to thereby identify the most frequent time spans for each key term or concept. For example, the most frequently occurring time spans in the plot across the entire span of time represented in the plot may be determined to be the "normal" time span for the domain, e.g., the most frequently referenced time span in the crowdsourcing sources is a "season". The "current" time span may be determined by applying the "normal" time span to a current date/time, e.g., the "current" time span may be the present "season" where if the present date/time is November 2013, then the current time span is the 2013 season. The most frequently occurring time span in the plot at some selected period of time prior to the current time span in the plot may be determined to be the "historical" time span, e.g., the most frequently referenced time spans in the crowdsourcing sources prior to the current time span are seasons prior to 1990. For example, a subject matter expert may select the time spans prior to the current time spans that are to be considered historical for the domain, a predetermined portion of the previous time spans may be selected to be historical time spans, e.g., X % of the earliest time spans in the plot, or the like. Thus, one or more date/time span categories are identified for the domain.

Figure 4A:
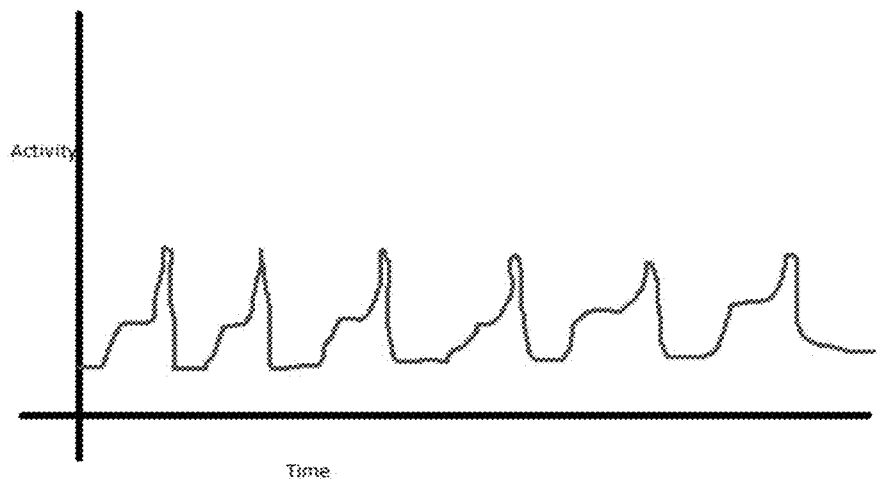
FIG. 4A is an example diagram of a plot of the concept occurrence frequency against time in accordance with one illustrative embodiment.

FIG. 4A is an example diagram of a plot of the concept occurrence frequency against time in accordance with one illustrative embodiment. The plot shown in FIG. 4A is an example of data obtained from crowdsourcing sources for an example National Football League (NFL) domain. The plot identifies the activity of crowdsourcing sources and crowdsourced indicators with regard to the particular plotted key term/concept during the various time periods, e.g., "The best defense of the 2013 season" would cause a plot of this statement in the time period of the NFL year 2013 season for the concept "best defense" (based on the collective crowdsource indicators and/or frequency of occurrence of the concept "best defense" in sources that also reference or have a relationship with the 2013 season). Thus, the activity is a combination of the number of mentions of the particular plotted key term/concept during in relation to the particular time period, or frequency of the key term/concept, and the frequency of the collective crowdsource indicators associated with the key terms/concepts. For example, a post "Great game by the NFL Chicago Bears this week", may have 2000 replies, 400 likes, and 300 re-tweets. The summation of the collective gamification and crowdsourced indicators are tallied as activities to the key terms/concepts "NFL Game" and "Week" time span. A peak of this activity is plotted in the graph and it would likely be on the day the game was played. A similar activity would likely show up the following week at the same time, thus giving the peaks that normalize and categorize the time span for Week and NFL Game. A plot of the type in FIG. 4A may be generated for a plurality of different key terms/concepts identified in the given domain.

The plots of each of the key terms/concepts for the domain may be iterated over and analyzed to determine the most relevant time spans for the particular key terms/concepts. Iterating over all of these plots gives an indication as to the most relevant time spans for the domain as a whole, e.g., if the time span "season" is identified as being most frequent in each of a plurality of plots, then it is most likely that the "season" time span is of high relevance to the domain.

The identification of the most frequently occurring time spans in each plot may be identified through programmatic analysis to locate patterns that would indicate a time span for the corresponding key term/concept in the domain. One type of pattern that may be identified is when the curve plateaus from a discrete increase in value for a particular time and then falls in a discrete manner after the plateau. This is indicative of a time span of relevance to the domain. In other words, if the extrapolated graph points form a shape that rises in one discrete step, then levels, and then falls in one discrete step, the mechanisms of the illustrative embodiments reason that the boundaries of this shape on the time span axis are the time span for the concept. Other shapes and formations within the graph may also be identified as representative of date/time keywords or spans depending on the particular desired implementation.

For example, in the depicted example of FIG. 4A, it can be seen that the data has repeating overall shape with a pattern that repeats in one-year intervals. Thus, I can be programmatically determined that the normal time span for the NFL domain, based on the activity plot of FIG. 4A, is one year, e.g., 2012-2013. Searching the corpora 345 or corpus 347, the illustrative embodiments may determine that a cycle with high frequency of "2011-2012 season" and a different cycle with high frequency "2012-2013 season" are present. By similarity of those phrases, the mechanisms of the illustrative embodiments may determine that the cycle should be referred to as a "season."

Figure 4B:
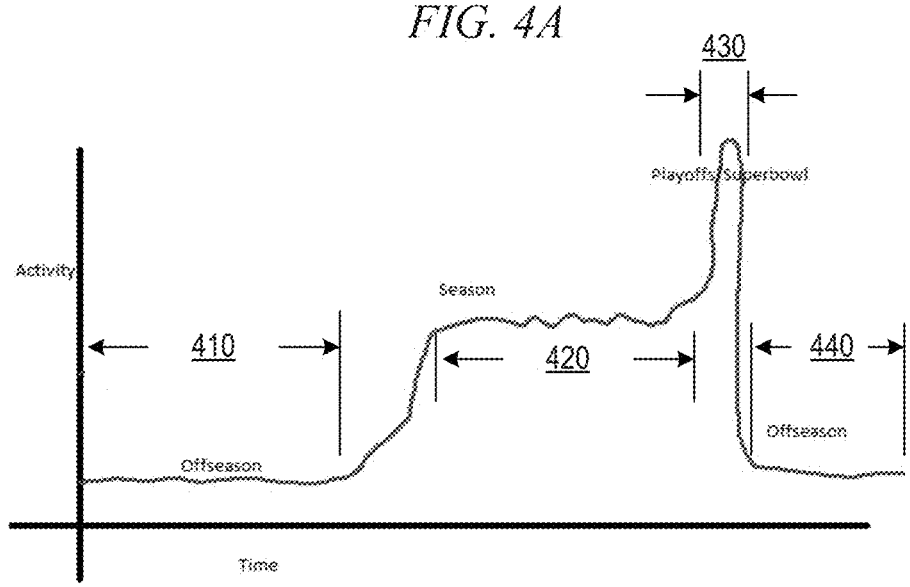
FIG. 4B is an example diagram of a plot of the concept occurrence frequency against time for an individual time span identified in the plot of FIG. 4A, e.g., a season in the depicted example.

FIG. 4B is an example diagram of a plot of the concept occurrence frequency for an individual time span identified in the plot of FIG. 4A, e.g., a season in the depicted example. As shown in FIG. 4B, there is a period of time 410 that is referred to as "offseason," a period of time 420 that represents the actual NFL season, a period of time 430 that represents the playoffs and Super Bowl, and a start of the next time span with the following "offseason" period of time 440. Through analysis performed by the mechanisms of the illustrative embodiments, the pattern of periods 420 for the actual may be identified by identifying an overall repeating shape in which the plateau of the plot corresponds to the NFL season time period 420. Logic may be provided for identifying a lower activity time period prior to the NFL season time period 420 as being an "offseason" time period 410 and a shortened period of higher activity after the NFL season time period 420 to be the playoff time period 430. Moreover, this logic may further determine that the "offseason" time period follows the playoff time period 430 and is prior to the NFL season time period 420. Furthermore, it can be determined from the time axis that the overall pattern repeats every year and thus, there is a correspondence between season (the predominant time period of the pattern) and the year so that "season" becomes the normal time span for the domain NFL.

Figure 4C:
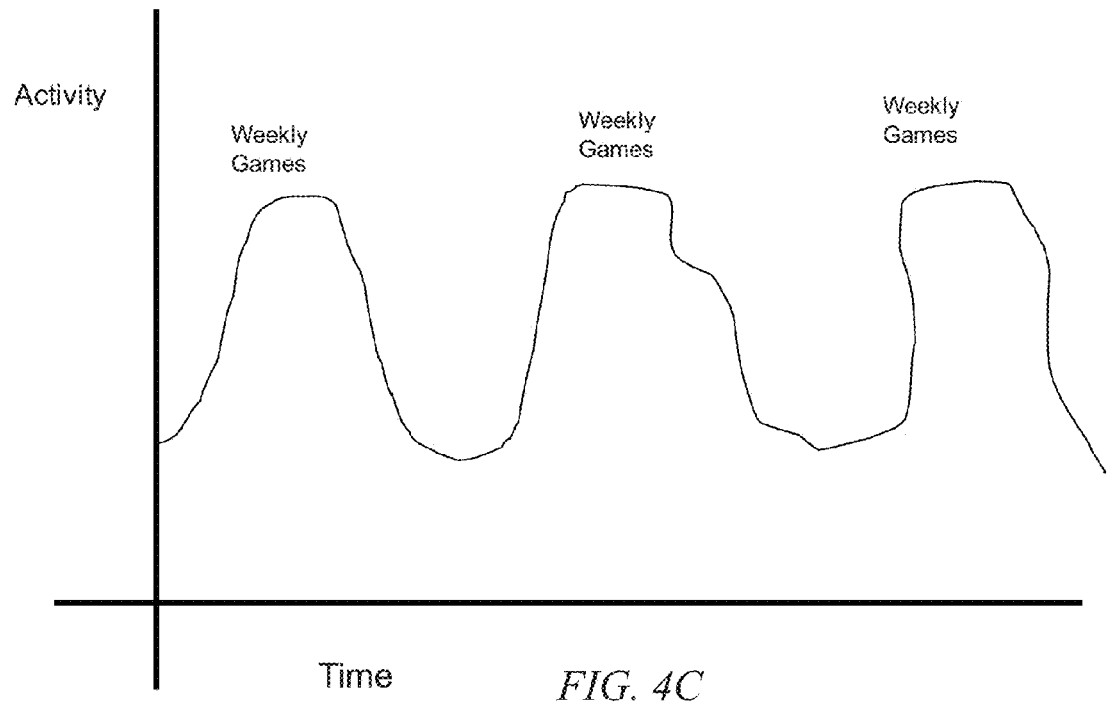
FIG. 4C is an example diagram of a plot of the concept occurrence frequency for a pattern of activity directed to weekly games in a sporting association.

FIG. 4C is an example diagram of a plot of the concept occurrence frequency for a pattern of activity directed to weekly games in a sporting association, e.g., the NFL. FIG. 4C shows a smaller grain pattern that may be identified using the mechanisms of the illustrative embodiments. That is, using the plot of activity for NFL team games versus time in FIG. 4C, one can determine that activity spikes using a repeated pattern on a weekly basis. Thus, there is a correspondence between NFL games and weeks such that the normal time span for NFL games is a week. Thus, through the use of the mechanisms of the illustrative embodiments as applied to the activity data obtained for the key terms/concepts of "season" and "game", one can determine that the corresponding normal time spans for these key terms/concepts are "year" and "week" respectively.

Figure 4D:
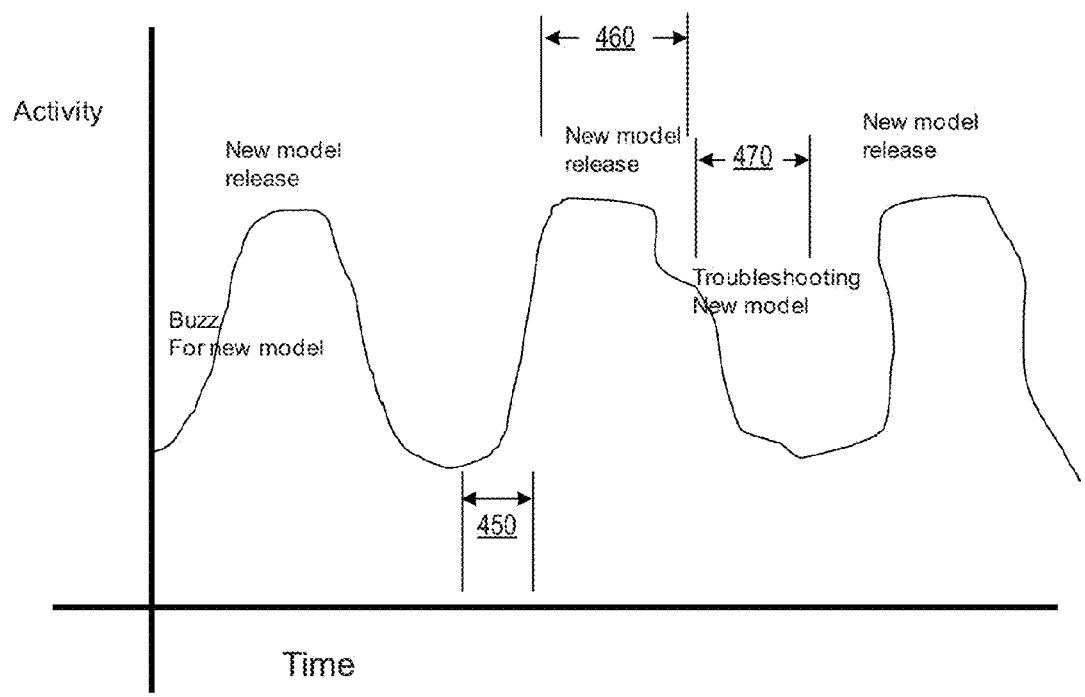
FIG. 4D is an example diagram of a plot of the concept occurrence frequency against time for a different domain than that of FIGS. 4A-4C.

FIG. 4D is an example diagram of a plot of the concept occurrence frequency against time for a different domain than that of FIGS. 4A-4C. As shown in FIG. 4D, the plot is for the release of a new version of an electronic product, e.g., an Apple Ipod™. As shown in this plot of activity versus time, there is a period 450 where there is a lot of conversation about the new upcoming version of the electronic device, followed by a period of time 460 where the new version is released. Thereafter, there is a period of time 470 where troubleshooting of the new version of the electronic device occurs. This cycle repeats for each new version of the electronic device. Each of the cycles will have occurrences of the term "device version x" (e.g., Ipod version 4) which is indicative of the cycle being a "device version" (e.g., Ipod™ version).

Thus, through the above analysis of crowdsourcing sources, the corpus ingestion engine 392 in FIG. 3 may determine the most frequently occurring date/time keywords or spans associated with a given domain. This operation can be performed to identify different temporal categories for the domain, such as normal temporal categories, historical temporal categories, and/or current temporal categories based on the relative frequency of the occurrence of the date/time keywords or spans and further statistical analysis to identify repeating patterns. For example, in the NFL domain, it may be determined that normally, individuals make statements regarding NFL domain concepts with regard to seasons but when referencing historical concepts, they refer to seasons prior to 1990, and the most current sources reference the current season. As a result, three temporal categories are generated: normal=season, current=current season, and historical=seasons prior to 1990. As noted above, this process may be performed during an ingestion operation for ingesting sources of content of a particular domain in order to identify the temporal categories associated with the particular domain. Thus, there may be different sets of temporal categories for different domains.

It should further be appreciated that as part of the ingestion of the corpus 347 or corpora 345, relationships between key terms/concepts and time spans are generated such that a mapping of the key terms/concepts to time spans is made possible. Thus, not only does the above process generate the time categorizations for the domain as a whole, but the above process also generates a mapping of key terms/concepts to particular time spans of interest. Therefore, if it is determined that the key term/concept "best defense" in an NFL domain is typically associated with a time span of "current season" then not only is this used to determine the temporal categorizations associated with the domain, but also may be used to map the key term/concept of "best defense" to "current season." Such mapping information for mapping key terms/concepts to particular time spans or temporal categories may be maintained in a temporal mapping data structure 396 for use in evaluating input questions and the sources of information used to generate answers for such input questions.

Referring again to FIG. 3, in order to evaluate the corpus, the sources of content in the corpus 347 are ingested by the ingestion engine 392 and evaluated with regard to the selected pre-defined temporal categories for the particular domain of that corpus 347 as either manually input by a subject matter expert or other authorized person, or automatically determined, such as in the manner previously described above. During ingestion, various criteria for determining a temporal category for a particular source within the corpus 347 may be utilized including, but not limited to, dates associated with the source as a whole, dates mentioned within the content of the document, and textual clues, markers, or references to temporal characteristics that may be evaluated with inference logic to infer a temporal categorization based on the textual clues, markers, or references. For example, a last modified date, creation date, posting date, etc. of the particular source (e.g., document, article, passage, posting, tweet, etc.) may be used as a basis for categorizing the source into one of the pre-defined temporal categories based on whether the date falls within a range of dates corresponding to the temporal category, e.g., normal=a season, current=current season, historical=all seasons before 1990. In another example, dates mentioned within the article itself may be identified and sorted to identify the temporal category of individual portions of the source or used to generate a temporal category for the source as a whole, e.g., majority categorization, average categorization, weighted categorization favoring a particular categorization, or any other categorization scheme suitable to the particular implementation. In still a further example, text markers, key terms, or clues within the text of the source may be used to determine a temporal category for the source, e.g., text markers or key terms such as "last season," "version 3," "Mac OS Lion".

Through the ingestion of the sources of content in the corpus 347, an annotated corpus is generated, e.g., annotations are added to metadata associated with the sources, that comprises annotations as to the temporal categorizations for the various sources which may then be used along with the analysis of the input question with regard to temporal categorizations to determine which sources in the corpus are relevant to the particular input question. These temporal categorizations may be matched to temporal categorizations associated with the extracted features of the input question to identify which sources of content are most relevant to the input question from a temporal perspective. For example, for the question "What is the best defense in the NFL?" it may be determined that the temporal categorization for the input question is the current season (i.e. a current time span categorization), and thus, an article about the best defenses in the NFL prior to 1990 would not be a relevant source for answering the question.

In order to perform such matching of input question temporal categorization to source temporal categorizations, the features of the input question extracted by the question and topic analysis 320 stage of the QA system pipeline 300 are evaluated by the question temporal analysis engine 394 of the temporal categorization engine 390 to determine a temporal classification for the input question. Initially, the question temporal analysis engine 394 determines if the input question 310 even has a temporal variability to it that would require a determination of a temporal categorization for the input question. That is, if the answer to the input question does not vary with time, then there is no need to perform temporal categorization for the input question, e.g., the answer to the question "What is the square root of 4356?" is constant and does not vary with time however the answer to the question "Who is the Secretary of Commerce?" will vary with time. The evaluation of whether an input question's answer varies with time will depend on the focus of the question, the lexical answer type (LAT), and other features of the input question. Through natural language processing techniques, these features are extracted and evaluated based on configured logic to determine if the focus, LAT, or other key features, are of a type that varies with time. This logic may be configured by subject matter experts or may be machine learned through various machine learning techniques. If it is determined that the answer to the input question may vary with time, then the question temporal analysis engine 394 continues processing of the input question to evaluate the input question for determination of a temporal categorization for the input question. If it is determined that the answer to the input question does not vary with time, then further analysis of the input question by the question temporal analysis engine 394 is discontinued.

This evaluation by the question temporal analysis engine 394 to determine a temporal categorization for the input question involves performing a lookup operation of the extracted features in the temporal mapping data structure 396 to determine if there are matching features, e.g., key terms/concepts, with an entry in the temporal mapping data structure 396. Thus, for example, if key terms in the input question are "best defense" or "defense" and "NFL", these terms may be used to identify a domain of the input question to thereby identify a corresponding temporal mapping data structure 396 for the domain and then perform a lookup operation in the temporal mapping data structure 396 for the domain of the key terms. In one illustrative embodiment, this lookup may be performed specifically for just the focus of the input question 310. In other illustrative embodiments a plurality or all of the key terms identified in the input question 310 may be used to perform multiple lookup operations and then combine the results of the lookup operations to generate a single temporal categorization for the input question, e.g., a majority vote mechanism in which the temporal categorization occurring most in the results of the lookup operation is utilized, a favoring of a particular temporal category if it is returned in the results (such as a "current" temporal category), or any other suitable logic for combining the results of multiple lookup operations.

If the key terms and extracted features of the input question do not have any matching entries in the temporal mapping data structure 396, then a default temporal categorization may be utilized. Alternatively, a similar analysis of the corpus 347 or corpora 345 as used during ingestion to identify relationships between key terms/concepts and time spans, with regard to the specific key term from the input question 310, may be performed to identify a relationship between the specific key term and a time span or temporal category which may then be added to the temporal mapping data structure 396.

Through the operation of the question temporal analysis engine 394, a temporal categorization of the input question is generated which may then be used to evaluate the sources of candidate answers identified by the hypothesis generation stage 340 and hypothesis and evidence scoring stage 350 of the QA system pipeline. For example, when generating hypothesis, or candidate answers, the hypothesis generation stage logic 340 may eliminate from consideration any sources in the corpus 347 or corpora 345 that do not have a matching temporal categorization. Thus, if the input question is concerned with a current time span, which in the context of the NFL domain may be a "current season", documents in the corpus 347 that are directed to historical information for the domain, e.g., best NFL defenses prior to 1990, may not be included in the evaluation. This filtering out of sources of candidate answers based on temporal categorizations may significantly reduce the amount of processing of sources of candidate answers that needs to be performed by the hypothesis generation stage logic 340 and focuses this logic's efforts on the sources that are most likely to provide the best candidate answer results for the temporal context of the input question 310.

Alternatively, or in addition to the filtering out of sources, scoring of evidence passages and evaluations of the candidate answers may be modified based on a degree of matching of the temporal categorization of the sources of the candidate answers, the evidence passages, or the like, to the temporal categorization of the input question 310. Thus, weight values applied to scores associated with sources whose temporal categorization matches the determined temporal categorization of the input question may be relatively higher than weight values applied to scores associated with sources whose temporal categorization does not match the determined temporal categorization of the input question. This in effect reduces the likelihood that candidate answers generated from sources that are not directed to the same time span as that of interest to the user that submitted the input question are going to be returned as correct answers for the input question while promoting candidate answers that are generated from sources that are directed to a same time span as that of the interest to the user, as determined from crowdsourcing sources through ingestion of the corpus 345, corpora 347, or a subset or sub-corpus.

In some illustrative embodiments, rather than identifying the temporal categorization of the input question through a lookup operation in the temporal mapping data structure 396, the temporal categorizations of the domain determined through the above ingestion process are used as a basis for evaluating the sources of candidate answers. That is, not only are candidate answers generated from the sources in the corpus 347 or corpora 345 in general, but the candidate answers may be generated with regard to the particular temporal categorizations of the domain. Thus, for example, if three temporal categorizations are established for use by the QA system pipeline 300, e.g., historical, normal, and current, then candidate answers may be generated for each of these temporal categorizations, evidence passages may be evaluated, scoring may be performed, and rankings determined within each of these temporal categorizations. As a result, in this example, three final answers may be generated: one for a historical temporal context, a second for a normal temporal context, and a third for a current temporal context. Each of these three answers may be generated and output to the user with an indication of the temporal context, or categorization, with which they correspond. Thus, the user is able to determine which answer best suits the user's intended temporal context of the input question 310. This functionality may also be implemented in response to an inability to determine a temporal categorization of the input question from the lookup operation previously described above, rather than utilizing a default temporal categorization.

It should be appreciated that while the above example embodiments are described in terms of three types of temporal categorizations, e.g., historical, normal, and current, the illustrative embodiments are not limited to such. Rather, any set of temporal categorizations may be used without departing from the spirit and scope of the illustrative embodiments. In addition, it should be appreciated that an input question and source of content may have multiple temporal categorizations in which case each temporal categorization may be evaluated in the manner described previously and the results combined to determine the relevancy of the source of the candidate answers to the input question with regard to temporal categorizations. Any programmatic manner of combining these results using configured logic is intended to be within the spirit and scope of the illustrative embodiments.

Thus, through the use of the mechanisms of the illustrative embodiments, a corpus may be ingested and evaluated with regard to temporal categorizations to determine the time spans with which each source of information in the corpus is associated as well as the time spans or temporal categories that are associated with the domain as a whole. A mapping of key terms/concepts and features of input questions to temporal categorizations or time spans may be generated and used to perform lookup operations to identify the temporal categorization of input questions. The temporal categorization of the input question may be used as a basis to further evaluate the sources of candidate answers to the input question based on a degree of matching of the temporal categorization or time spans associated with the sources and the temporal categorization or time spans associated with the input question. In some cases, the default temporal categorizations associated with the domain as a whole may be used when a temporal categorization for the input question cannot be determined. In other cases, candidate answers may be generated for each of the temporal categorizations and evaluated with regard to each separate temporal categorization with multiple final results returned, e.g., one for each temporal categorization.

In some illustrative embodiments, the sources of information used to generate the temporal categorizations and time spans associated with key terms/concepts and features of the input question and the domains is crowdsourcing sources, such as websites, news feeds, blogs, tweets, instant messaging, posts to various news groups or social networking websites, and the like. Such sources provide an indication as to the topics or concepts of interest to users within a given domain and the corresponding time spans with which these topics or concepts are being discussed. This gives an indication as to the most likely time spans of interest to users that submit input questions to a QA system when the input question itself does not provide an indication as to the temporal category or time span that is to be considered when answering the input question.

As a result of the operation of the illustrative embodiments, the operation of the QA system pipeline is focused on sources of information that are most likely to generate candidate answers that are directed to a similar temporal category as the intended temporal context of the input question. The intended temporal context of the input question is determined through logic of the QA system identifying features of the input question, identifying mappings of these features to temporal categorizations, and/or using domain temporal categorizations previously determined from the domain to which the input question is directed. Thus, while the user may submit an ambiguous input question with regard to temporal context, the QA system may automatically determine the most likely temporal context of the input question and evaluate the input question according to this automatically determined temporal context and the temporal context of the sources of candidate answers. Hence, a more accurate answer generation is achieved.

Figure 5:
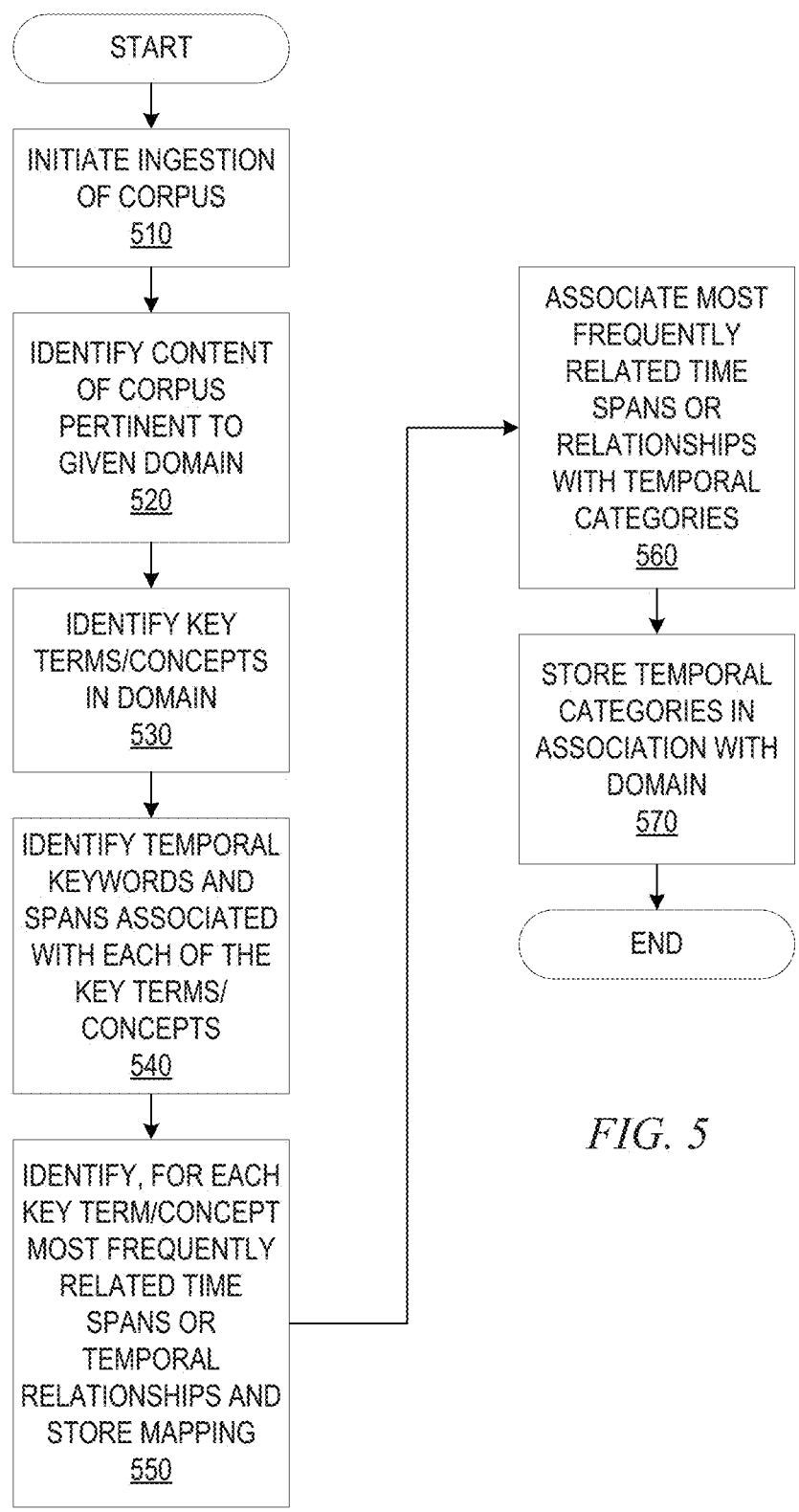
FIG. 5 is a flowchart outlining an example operation for identifying temporal categorizations for a domain in accordance with one illustrative embodiment.

As noted above, one of the features of the present invention is the ability to identify the temporal categorizations associated with a domain which may then be used to evaluate input questions and sources of information within the domain. FIG. 5 is a flowchart outlining an example operation for identifying temporal categorizations for a domain in accordance with one illustrative embodiment. The operation outlined in FIG. 5 may be performed, for example, by a corpus ingestion engine during ingestion of a corpus of sources of information for a given domain. For purposes of this description, and in accordance with one preferred embodiment of the present invention, the corpus of information being ingested are crowdsourcing sources, e.g., blogs, news groups/feeds, tweets, instant messages, posts to social networking websites, etc. However, it should be appreciated that the present invention is not limited to ingestion of crowdsourcing sources for the identification of temporal categorizations associated with domains. Other sources of content may be used as a basis for determining such temporal categorizations without departing from the spirit and scope of the illustrative embodiments.

As shown in FIG. 5, the operation starts by initiating ingestion of the corpus of content (step 510). The content of the corpus is analyzed to identify which content is pertinent to a given domain for which the ingestion is being performed (step 520). This operation may be performed by evaluating key terms of the content and their frequency of occurrence with regard to terms associated with the given document, for example. Any natural language processing mechanism that may be used to evaluate the relevancy of a source of content to a particular domain may be used without departing from the spirit and scope of the present invention.

The key terms and concepts in the domain are determined by analyzing the ingested corpus (step 530). This may be done in a number of different ways including generating inverse document frequency (IDF) statistics, n-gram counts for documents in the domain compared to the overall corpus of documents to thereby identify words/phrases that appear much more often in the domain as opposed to the corpus as a whole, performing semantic analysis, such as by way of a slot grammar parser, predicate-argument structure builder, named entity recognizer, co-reference resolution component, relation extraction component, or the like.

Having identified key terms and concepts in the domain, temporal keywords and spans, e.g., dates, times, date/time ranges, etc., associated with each of these key terms and concepts are identified in each source of content in the ingested corpus (step 540). This again may be done in many different ways including examining the time-related terms that appear in close proximity, e.g., within the same sentence as the concept in the source, examining the dates/times associated with the source as a whole, e.g., creation/last modification dates, examining date/time keywords in headers, metadata, or other structures of the source, and the like. A final temporal relationship for each concept is established by evaluating and merging the candidate temporal relationships found. If no temporal information is identified in the source in relation to the particular key term/concept, then the date/time information for the source itself may be used.

For each key term/concept, the most frequent related time spans or temporal relationships are identified and stored in a key term/concept temporal mapping data structure (step 550). In order to determine the most frequent related time spans, a plot of a graph of the concept occurrence frequency against time using the temporal relationship is generated and the graph is programmatically analyzed to locate patterns that indicate a time span for the concept within the domain. For example, if the extrapolated graph points form a shape that rises in one discrete step, levels off, and then falls in one discrete step, it is determined that the boundaries of this pattern on the time axis represent the time span for the concept.

The most frequently related time spans are then associated with particular temporal categories, e.g., historical, normal, current, etc., for the domain (step 560). The temporal categories are then stored in association with the domain such that they may be retrieved when evaluating input questions directed to that domain (step 570). The operation then terminates.

Figure 6:
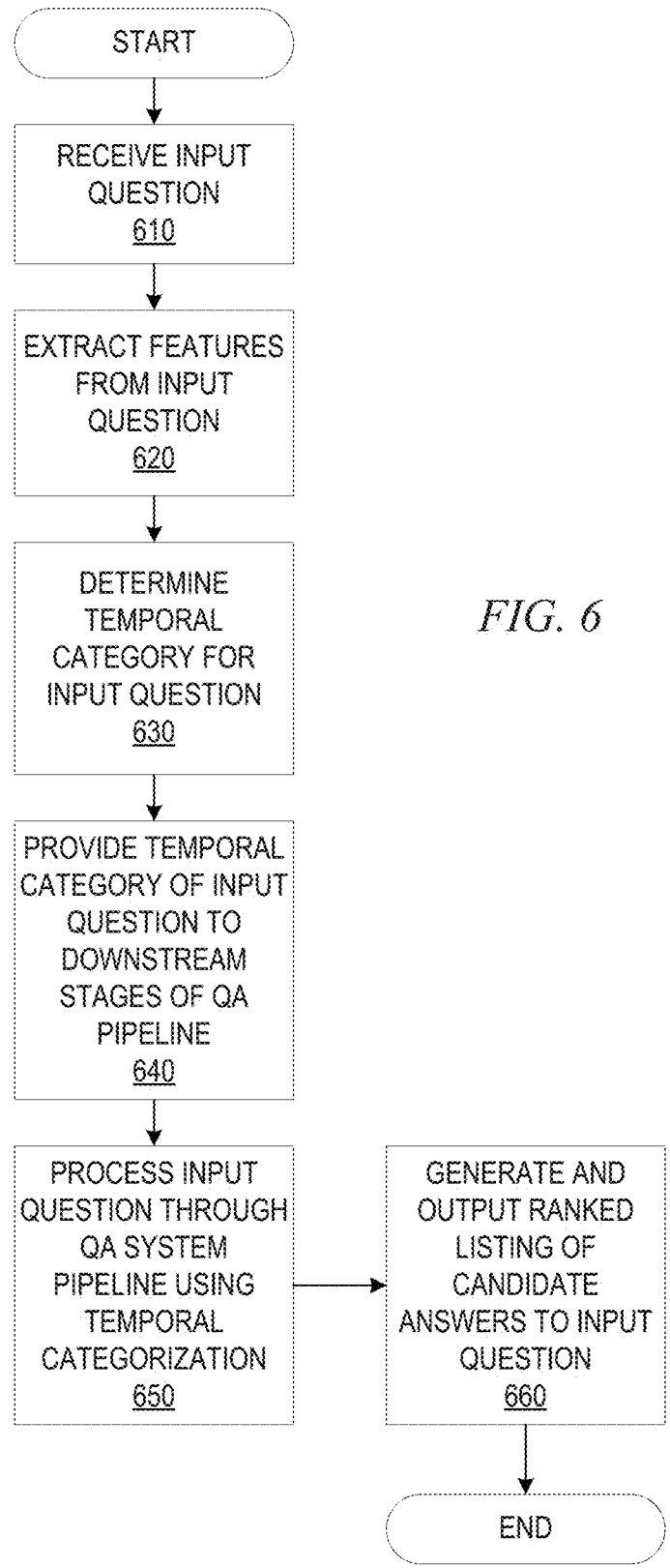
FIG. 6 is a flowchart outlining an example operation for answering an input question based on a temporal categorization of the input question in accordance with one illustrative embodiment.

Another key feature of embodiments of the present invention is the ability to identify the temporal categorization of input questions and utilize that temporal categorization to evaluate candidate answers to the input question so as to achieve a higher accuracy of answer generation by a QA system. FIG. 6 is a flowchart outlining an example operation for answering an input question based on a temporal categorization of the input question in accordance with one illustrative embodiment. The operation outlined in FIG. 6 may be performed by a QA system pipeline using temporal categorization information and a temporal categorization engine in accordance with the illustrative embodiment.

As shown in FIG. 6, the operation starts with the receiving of an input question into the QA system pipeline (step 610). The input question is processed to extract features from the input question (step 620). The features are provided to a temporal categorization engine for determination of a temporal category for the input question (step 630). The determination of the temporal category for the input question may take many different forms including performing one or more lookup operations in a temporal mapping data structure to identify temporal categories for the various extracted features, performing searches of the corpus to identify time spans associated with the extracted features, using the stored temporal categories associated with the domain, or the like.

The temporal categorization of the input question is then provided to the downstream stages of the QA system pipeline to be included in evaluating candidate answers and evidence scoring (step 640). The ways in which the temporal categorization of the input question may be integrated into the evaluation of the candidate answers and evidence scoring may take many different forms including defining weights to be applied to scores generated for candidate answers and/or evidence passages, filtering out sources of content in the corpus that do not have a temporal category corresponding to the temporal category of the input question, or the like. The input question is then processed through the QA system pipeline taking into consideration the temporal categorization of the input question and the sources of candidate answers so as to generate a ranked listing of one or more candidate answers for the input question (step 650). The ranked listing of candidate answers is then returned to the source of the input question (step 660) and the operation terminates.

It should be noted that while the above illustrative embodiments are described as having the temporal categorization being used to influence the sources of content used to generate candidate answers, or to modify the scoring of the candidate answers, the illustrative embodiments are not limited to such and any mechanism that may take into consideration the temporal categorization of the input question and/or the sources of content used to generate candidate answers may be used without departing from the spirit and scope of the illustrative embodiments.

For example, in another illustrative embodiment of the present invention, the input question itself may be modified to reflect the determined temporal category for the input question. Thus, for example, if an original input question is of the type "What is the best NFL defense?", and it is determined through analysis performed by the mechanisms of the illustrative embodiments, e.g., analysis of crowdsourced sources and indicators, that "best NFL defense" is typically answered from a historical context, then the original input question may be modified or augmented to be of the type "What is the best NFL defense historically?". Similarly, if the temporal categorization results in the current time span of "current season" being the most frequently occurring time span for answer this question, then the original input question may be modified or augmented to be of the type "What is the best NFL defense this season?" The resulting modified or augmented questions may then be processed by the QA system pipeline in a normal manner which, by virtue of the mentioning of the applicable temporal categorization in the input question itself, causes the QA system pipeline to take into consideration the temporal categorization when generating candidate answers to the input question. Thus, in addition to modifying the sources used and the scores generated for candidate answers, the mechanisms of the illustrative embodiments may further modify and augment the input questions based on the temporal categorization identified through application of the present invention.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system comprising a processor and a memory, for processing sources of content in a corpus of information associated with a domain, comprising:

ingesting, by the data processing system, a plurality of sources of content in the corpus of information associated with the domain;

determining, by the data processing system, at least one temporal category for the domain based on frequencies of occurrence of references to at least one of temporal terms or time spans specified in the plurality of sources of content in the corpus of information associated with the domain, wherein the domain is a classification of subject matter common to a plurality of portions of content from the plurality of sources of content;

storing, by the data processing system, the at least one temporal category for the domain in association with the domain; and processing, by the data processing system, queries applied to the plurality of sources of content in the corpus of information associated with the domain based on the stored at least one temporal category for the domain, wherein processing queries applied to the plurality of sources of content in the corpus of information associated with the domain based on the stored at least one temporal category for the domain comprises:

receiving an input question for which an answer is to be generated;

analyzing the input question to determine a corresponding domain of the input question;

retrieving a stored at least one temporal category for the corresponding domain of the input question; and determining a temporal category for the input question based on the retrieved at least one temporal category for the corresponding domain.

2. The method of claim 1, wherein determining the at least one temporal category for the domain comprises:

determining at least one of key terms or key concepts referenced in the plurality of sources of content;

determining, for each key term or key concept referenced in the plurality of sources of content, associated key temporal terms or time spans referenced within a given proximity of the key term or key concept in the plurality of sources of content;

determining a frequency of occurrence of the associated key temporal terms or time spans for each key term or key concept; and identifying one or more key temporal terms or time spans, across all of the key terms or key concepts referenced in the plurality of sources of content associated with the domain, to determine the at least one temporal category for the domain.

3. The method of claim 2, wherein determining a frequency of occurrence of the associated key temporal terms or time spans for each key term or key concept comprises, for each key term or key concept, generating a graph of a number of occurrences of references to the key term or key concept in association with the key temporal terms or time spans.

4. The method of claim 3, wherein determining the frequency of occurrence of the associated key temporal terms or time spans further comprises performing pattern recognition on the graph to identify portions of the graph representing potential temporal categorizations for the domain.

5. The method of claim 4, wherein the pattern recognition identifies plateaus in the graph that are indicative of a temporal categorization.

6. The method of claim 4, wherein identifying one or more key temporal terms or time spans, across all of the key terms or key concepts referenced in the plurality of sources of content associated with the domain, comprises:

generating a graph of the number of occurrences of references to the key term or key concept in association with the key temporal terms or time spans for each key term or key concept; and identifying a most frequently occurring pattern occurring across all of the graphs for all of the key terms or key concepts referenced in the plurality of sources of content associated with the domain.

7. The method of claim 2, further comprising:
associating each of the identified one or more key temporal terms or time spans with a corresponding temporal category for the domain.

8. The method of claim 1, wherein the plurality of sources of content comprise crowdsource sources and crowdsource indicators.

9. The method of claim 1, wherein the corpus of information is one corpus in a plurality of corpora, and wherein at least one second corpus of information in the plurality of corpora is associated with a second domain that is different than the domain associated with the corpus of information, and wherein the second domain has a second stored set of temporal categories that is different than the at least one temporal category associated with the corpus of information.

10. A computer program product comprising a non-transitory computer readable medium having a computer readable program stored therein, wherein the computer readable program, when executed on a data processing system, causes the data processing system to:
ingest a plurality of sources of content in a corpus of information associated with a domain;
determine at least one temporal category for the domain based on frequencies of occurrence of references to at least one of temporal terms or time spans specified in the plurality of sources of content in the corpus of information associated with the domain, wherein the domain is a classification of subject matter common to a plurality of portions of content from the plurality of sources of content;
store the at least one temporal category for the domain in association with the domain; and
process queries applied to the plurality of sources of content in the corpus of information associated with the domain based on the stored at least one temporal category for the domain, wherein the computer readable program further causes the data processing system to process queries applied to the plurality of sources of content in the corpus of information associated with the domain based on the stored at least one temporal category for the domain at least by:
receiving an input question for which an answer is to be generated;
analyzing the input question to determine a corresponding domain of the input question;
retrieving a stored at least one temporal category for the corresponding domain of the input question; and
determining a temporal category for the input question based on the retrieved at least one temporal category for the corresponding domain.

11. The computer program product of claim 10, wherein the computer readable program further causes the data processing system to determine the at least one temporal category for the domain at least by:
determining at least one of key terms or key concepts referenced in the plurality of sources of content;
determining, for each key term or key concept referenced in the plurality of sources of content, associated key temporal terms or time spans referenced within a given proximity of the key term or key concept in the plurality of sources of content;
determining a frequency of occurrence of the associated key temporal terms or time spans for each key term or key concept; and
identifying one or more key temporal terms or time spans, across all of the key terms or key concepts referenced in the plurality of sources of content associated with the domain, to determine the at least one temporal category for the domain.

12. The computer program product of claim 11, wherein determining a frequency of occurrence of the associated key temporal terms or time spans for each key term or key concept comprises, for each key term or key concept, generating a graph of a number of occurrences of references to the key term or key concept in association with the key temporal terms or time spans.

13. The computer program product of claim 12, wherein determining the frequency of occurrence of the associated key temporal terms or time spans further comprises performing pattern recognition on the graph to identify portions of the graph representing potential temporal categorizations for the domain.

14. The computer program product of claim 13, wherein the pattern recognition identifies plateaus in the graph that are indicative of a temporal categorization.

15. The computer program product of claim 13, wherein identifying one or more key temporal terms or time spans across all of the key terms or key concepts referenced in the plurality of sources of content associated with the domain comprises:
generating a graph of the number of occurrences of references to the key term or key concept in association with the key temporal terms or time spans for each key term or key concept; and
identifying a most frequently occurring pattern occurring across all of the graphs for all of the key terms or key concepts referenced in the plurality of sources of content associated with the domain.

16. The computer program product of claim 11, wherein the computer readable program further causes the data processing system to:
associate each of the identified one or more key temporal terms or time spans with a corresponding temporal category for the domain.

17. The computer program product of claim 10, wherein the plurality of sources of content comprise crowdsource sources and crowdsource indicators.

18. An apparatus comprising:
a processor; and
a memory coupled to the processor, wherein the memory comprises instructions which, when executed by the processor, cause the processor to:
ingest a plurality of sources of content in a corpus of information associated with a domain;
determine at least one temporal category for the domain based on frequencies of occurrence of references to at least one of temporal terms or time spans specified in the plurality of sources of content in the corpus of information associated with the domain, wherein the domain is a classification of subject matter common to a plurality of portions of content from the plurality of sources of content;
store the at least one temporal category for the domain in association with the domain; and
process queries applied to the plurality of sources of content in the corpus of information associated with the domain based on the stored at least one temporal category for the domain, wherein the instructions further cause the processor to process queries applied to the plurality of sources of content in the corpus of information associated with the domain based on the stored at least one temporal category for the domain at least by:
receiving an input question for which an answer is to be generated;
analyzing the input question to determine a corresponding domain of the input question;
retrieving a stored at least one temporal category for the corresponding domain of the input question; and
determining a temporal category for the input question based on the retrieved at least one temporal category for the corresponding domain.

* * * * *